Patented Dec. 10, 1946

2,412,349

UNITED STATES PATENT OFFICE 2,412,349

PURIFICATION OF TITANIUM TETRACHLORIDE

Bernard C. Meyers, Barberton, Ohio, assignor to Pittsburgh Plate Glass Company, Pittsburgh, Pa., a corporation of Pennsylvania No Drawing. Application March 15, 1944, Serial No. 526,659

6 Claims. (Cl. 23—87)

This invention relates to the purification of liquid metallic halides of the fourth group of the periodic table. More specifically, the invention relates to a method of removing iron and vanadium impurities from an impure titanium tetrachloride obtained by direct chlorination of titanium ore.

One purpose of this invention is to provide a novel and useful method of separating liquid metal halides from impure mixtures. A further purpose is to provide a method of removing traces of vanadium compounds and other color producing bodies from titanium tetrachloride.

In a copending application, Serial 465,799, filed by Bernard De Witt on November 16, 1942, now Patent No. 2,370,525, granted February 27, 1945, there is described and claimed a method of purifying liquid metallic halides, and titanium tetrachloride in particular, by treatment with hydrogen sulfide in the presence of heavy metal soaps, such as ferric stearate, and subsequently distilling the treated halide.

I have invented a greatly simplified process for removing impurities from liquid halides and especially titanium tetrachloride. The new procedure is particularly effective for removing vanadium compounds which cannot be removed by distillation alone.

In accordance with my invention I mix the impure liquid halide with a small proportion of soap, such as 0.1 to 1 percent by weight of an alkali metal salt of a high molecular weight fatty acid. The alkali salts of stearic, myristic, palmitic, oleic, and lauric acids are suitable for this purpose. Especially useful are the mixtures of said salts prepared by the reaction of alkali metal hydroxide on animal and vegetable fats. The admixture to the impure halides is made by stirring, preferably with a mechanical mixer or other suitable device, until a thorough dispersion of the soap is obtained. No heating is required. The halide so treated is subsequently evaporated and condensed by usual methods. A colorless product practically free of vanadium is thereby recovered.

The mechanism of the reaction is not fully understood. The vanadium compounds usually present in impure titanium tetrachloride are readily vaporized and therefore distillation procedures are ineffective in separating these impurities. It is believed that the reaction with soap converts the impurities into compounds which are not readily vaporized. Accordingly, the distillation subsequent to a soap treatment produces a water white titanium tetrachloride almost free of vanadium. Although the procedure is regarded as particularly effective in removing vanadium compounds, it will also remove a substantial portion of the iron compounds which are usually present when the crude titanium tetrachloride is obtained by the direct chlorination of ilmenite ore.

Generally, when titanium tetrachloride is to be recovered from titanium ore, such as ilmenite, it is desirable to separate the bulk of the impurities by fractional condensation prior to treatment in accordance with this invention. The titanium tetrachloride thus obtained by fractional condensation frequently will contain less than 0.1 percent by weight of vanadium and yet will have a pronounced discoloration caused by such impurity. The practice of the present invention will be effective in removing all traces of this discoloration. When the titanium tetrachloride is intended for the manufacture of titanium dioxide pigments it is especially necessary to remove a very high proportion of vanadium and iron. The invention enables a reduction in the vanadium content to less than 0.001 percent.

The following examples are illustrative of my invention:

Example I

A crude titanium tetrachloride having a yellowish discoloration and containing 0.083 percent by weight vanadium was stirred vigorously with 0.5 percent by weight sodium stearate based on the weight of crude titanium tetrachloride. After twenty minutes of stirring, the mixture was distilled to produce a clear colorless titanium tetrachloride containing less than 0.003 percent by weight vanadium compounds.

Example II

Crude titanium tetrachloride was prepared by fractional condensation of the vapors obtained from the chlorination of ilmenite ore ($FeO.TiO_2$). It contained 0.096 percent by weight vanadium and was pale yellow in color. The titanium tetrachloride was mixed with one percent by weight of white commercial soap flakes (88 percent sodium stearate). The mixture was stirred for one hour without heating and then was permitted to stand for 18 hours. The treated material was vaporized in a steam jacketed kettle and the vapors condensed in a water-cooled nickel tubular condenser. The purified product was analyzed for vanadium and only a trace, probably less than 0.0001 percent by weight, was found.

Example III

Crude titanium tetrachloride (5500 pounds) containing 0.076 percent by weight vanadium was mixed with 20 pounds of commercial soap chips in a closed stainless steel tank provided with a steam coil at the bottom. After standing for one hour high pressure steam (138–40° C.) was passed through the coil. The titanium tetrachloride vapors thereby formed were passed through a series of water-cooled tubes. The liquid titanium tetrachloride which condensed contained about 0.0005 percent by weight vanadium.

Example IV

One liter of stannic chloride having a slight yellow discoloration was mixed with 5 grams of a white soap powder consisting principally of sodium stearate. The mixture was stirred until the soap was dissolved. The solution was then vaporized and the vapor condensed. A water white stannic chloride was thereby obtained.

Although the invention has been described with respect to certain specific embodiments, it is not intended that the details thereof shall be regarded as limitations on the scope of the claims except as incorporated in the appended claims.

I claim:

1. A process for purifying a substantially anhydrous liquid halide of a metal of the fourth periodic group of elements which comprises dispersing a small quantity of an alkali metal soap therein, vaporizing the halide, and condensing the halide vapors.

2. A process for purifying a substantially anhydrous titanium tetrachloride which comprises dispersing a small quantity of an alkali metal soap therein, vaporizing the titanium tetrachloride, and condensing the titanium tetrachloride vapors.

3. A process for purifying a substantially anhydrous titanium tetrachloride which comprises dissolving 0.1 percent to 1.0 percent by weight of an alkali metal soap therein and subjecting the solution to distillation.

4. A process for purifying a substantially anhydrous liquid halide of a metal of the fourth periodic group of elements which comprises dispersing a small quantity of an alkali metal stearate therein, vaporizing the halide, and condensing the halide vapors.

5. A process for purifying substantially anhydrous titanium tetrachloride which comprises dispersing from 0.1 percent to 1.0 percent of alkali metal stearate therein, vaporizing the titanium tetrachloride and condensing the titanium tetrachloride vapors.

6. A process for purifying substantailly anhydrous titanium tetrachloride which comprises mixing therewith a small quantity of an alkali metal soap and subjecting the resulting mixture to distillation.

BERNARD C. MEYERS.